United States Patent
Li et al.

(10) Patent No.: US 8,251,693 B2
(45) Date of Patent: Aug. 28, 2012

(54) INJECTION MOLD HAVING BEARING PLATES TO UNDERTAKE A CLOSING MOLD PRESSURE

(75) Inventors: Jian-ming Li, Tu Cheng (TW); Xiao-ping Wu, Tu Cheng (TW); Shih-hsiung Ho, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 47 days.

(21) Appl. No.: 12/901,395

(22) Filed: Oct. 8, 2010

(65) Prior Publication Data
US 2012/0088008 A1    Apr. 12, 2012

(51) Int. Cl.
*B29C 45/64* (2006.01)
(52) U.S. Cl. .......... 425/577; 425/589; 425/590
(58) Field of Classification Search .......... 425/577, 425/574, 589, 590
See application file for complete search history.

(56) References Cited

U.S. PATENT DOCUMENTS
6,241,931 B1 * 6/2001 Ciccone et al. .......... 425/577
* cited by examiner

*Primary Examiner* — Tim Heitbrink
(74) *Attorney, Agent, or Firm* — Cheng-Ju Chiang

(57) ABSTRACT

Disclosed is an injection mold, comprising a moving half, a fixed half and a plurality of bearing plates positioned therebetween. The moving half comprises a moving half plate and a moving half core positioned thereon. The fixed half comprises a fixed half plate and a fixed half cavity positioned thereon. The bearing plates are positioned on one of the fixed half plate and the moving half plate and a bearing surface is formed thereon. The moving half core and the fixed half cavity contact with each other partially to form an arrangement surface. With the bearing plates positioned therebetween, the bearing surface and the arrangement surface can undertake the closing mold pressure generated by an injection molding machine together for reducing the arrangement surface area. The molding is easy and cost drops to improve productivity. The closing mold balance of the entire injection mold can be preferably ensured.

4 Claims, 4 Drawing Sheets

INJECTION MOLD HAVING BEARING PLATES TO UNDERTAKE A CLOSING MOLD PRESSURE

BACKGROUND OF THE INVENTION

1. Field of the Invention

The present invention generally relates to a mold, and more particularly to an injection mold.

2. Description of Prior Art

Please refer to FIG. 6 and FIG. 7. A conventional injection mold 80 comprises a moving half 81 and a fixed half 82. The moving half 81 comprises a moving half plate 811 and a moving half core 812 positioned on the moving half plate 811. The fixed half 82 comprises a fixed half plate 821 and a fixed half cavity 822 positioned on the fixed half plate 821. When the injection mold 80 is closed, the moving half core 812 and the fixed half cavity 822 are locked together. The contact surfaces of the moving half core 812 and the fixed half cavity 822 become an arrangement surface 83. A tiny space exists between the moving half plate 811 and the fixed half plate 821.

However, only the arrangement surface 83 of the injection mold 80 undertakes the closing mold pressure of an injection molding machine. Therefore, the arrangement surface 83 needs to be large enough as considering the closing mold pressure of the injection molding machine. The demand for the manufacturing accuracy of the arrangement surface 83 is very critical, so that the manufacturing takes time and the manufacturing cost is quite an amount. Moreover, the closing mold balance of the entire injection mold is likely to be lost when merely the arrangement surface 83 is used to undertake the closing mold pressure of the injection molding machine.

SUMMARY OF THE INVENTION

For solving the drawbacks of the aforementioned prior art, an objective of the present invention is to provide an injection mold, with easy molding, dropped cost and preferably ensuring the closing mold balance of the injection mold.

For realizing the aforesaid objective, the injection mold of the present invention comprises moving half, a fixed half and a plurality of bearing plates positioned between the fixed half plate and the moving half plate. The moving half comprises a moving half plate and a moving half core positioned on the moving half plate. The fixed half comprises a fixed half plate and a fixed half cavity positioned on the fixed half plate. The bearing plates are positioned on one of the fixed half plate and the moving half plate and a bearing surface is formed on the bearing plates. The moving half core and the fixed half cavity contact with each other partially to form an arrangement surface of the injection mold.

As aforementioned, with the bearing plates positioned between the fixed half plate and the moving half plate, the bearing surface and the arrangement surface of the injection mold can undertake the closing mold pressure generated by an injection molding machine for reducing the area of the arrangement surface. Accordingly, the molding can be easy and the molding cost drops so as to improve productivity. The closing mold balance of the entire injection mold can be preferably ensured.

DETAILED DESCRIPTION OF THE INVENTION

Figure 1:
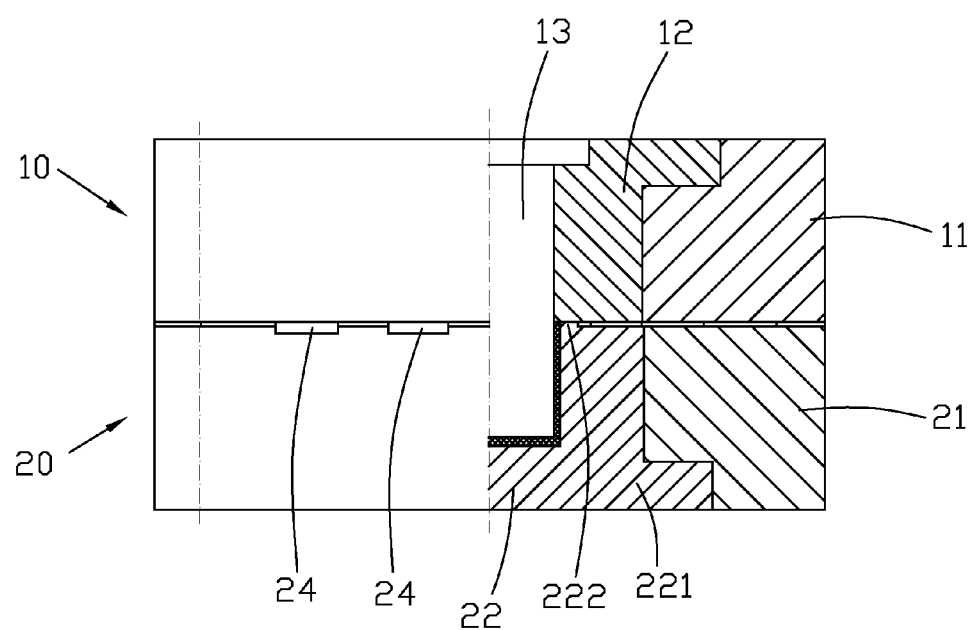
FIG. 1 shows a partial sectional view diagram of an embodiment of an injection mold in a closing mold status according to the present invention.
Figure 2:
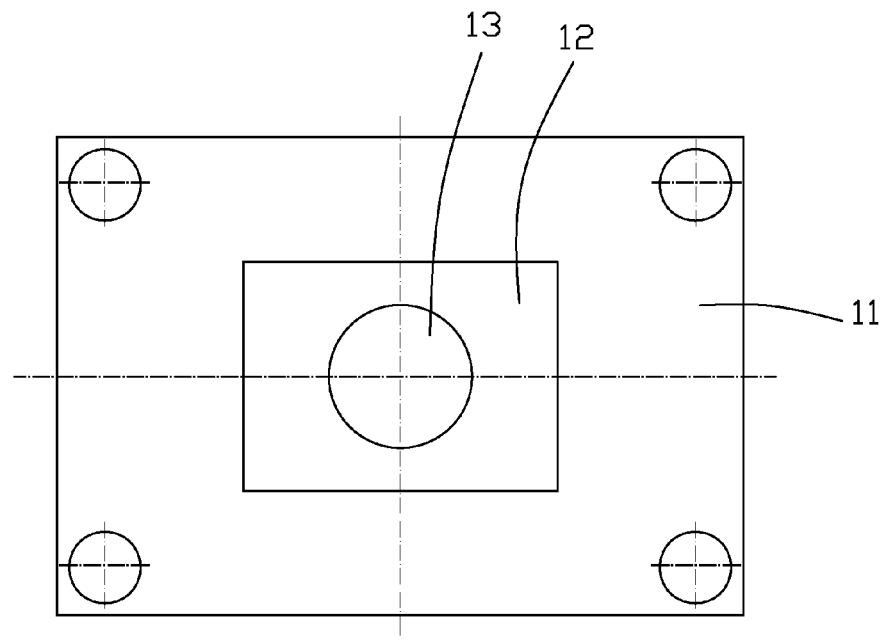
FIG. 2 shows a top view diagram of a moving half of the injection mold shown in FIG. 1.
Figure 3:
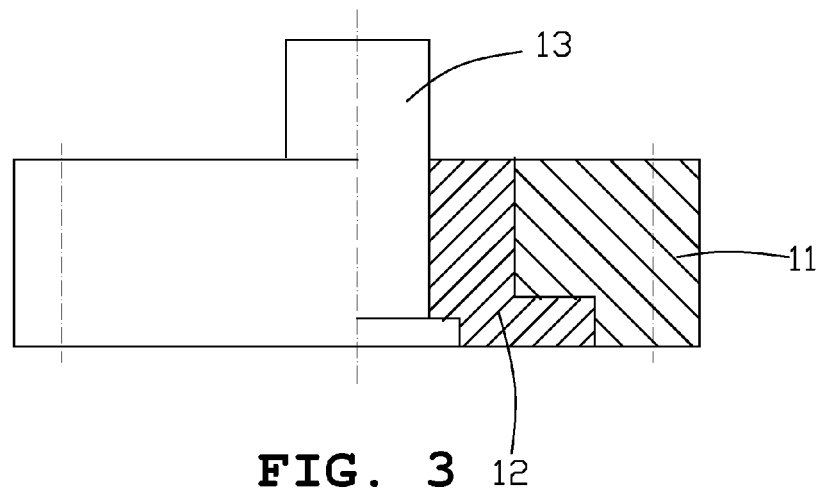
FIG. 3 shows a partial top sectional view diagram of the moving half shown in FIG. 2.

Please refer to FIG. 1. The injection mold 1 of the present invention comprises a moving half 10 and a fixed half 20. Please refer to FIG. 2 and FIG. 3. The moving half 10 comprises a moving half plate 11 and a moving half core 12. The moving half core 12 comprises a core 13. The moving half core 12 is positioned on the moving half plate 11. The moving half core 12 can extend out of the moving half plate 11 or can be positioned in the same horizontal plane as the moving half plate 11. In this embodiment, the moving half core 12 and the moving half plate 11 are in a horizontal plane. The core 13 extends out of the moving half core 12.

Figure 4:
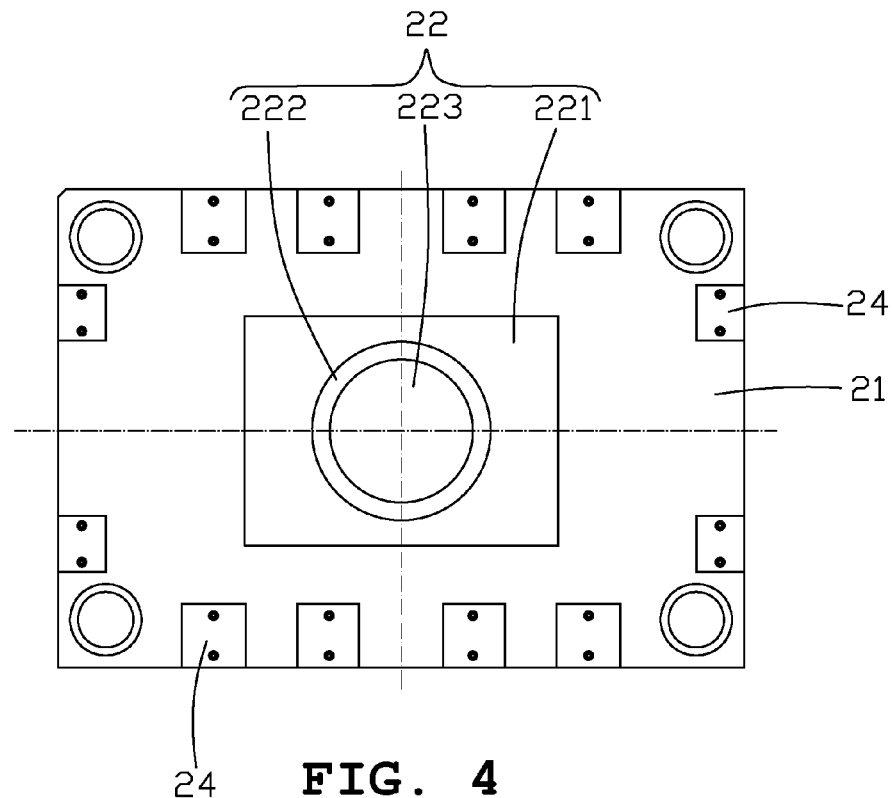
FIG. 4 shows a top view diagram of a fixed half of the injection mold shown in FIG. 1.
Figure 5:
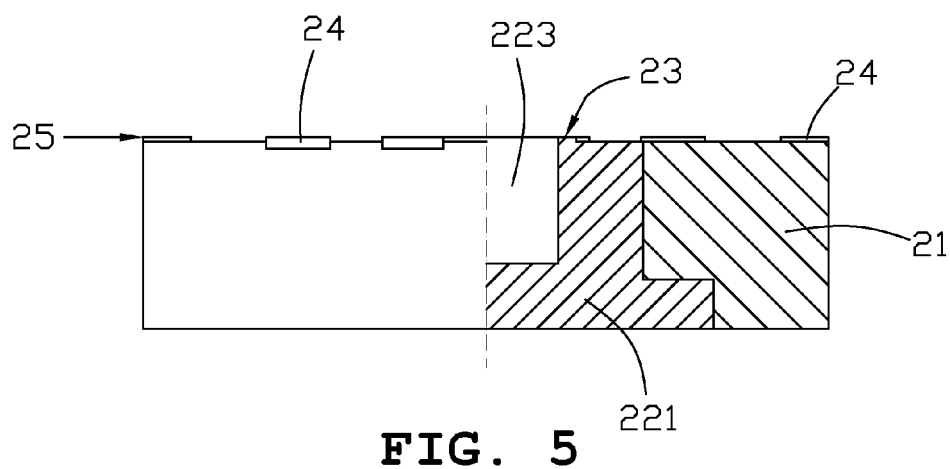
FIG. 5 shows a partial top sectional view diagram of the fixed half shown in FIG. 4.
Figure 6:
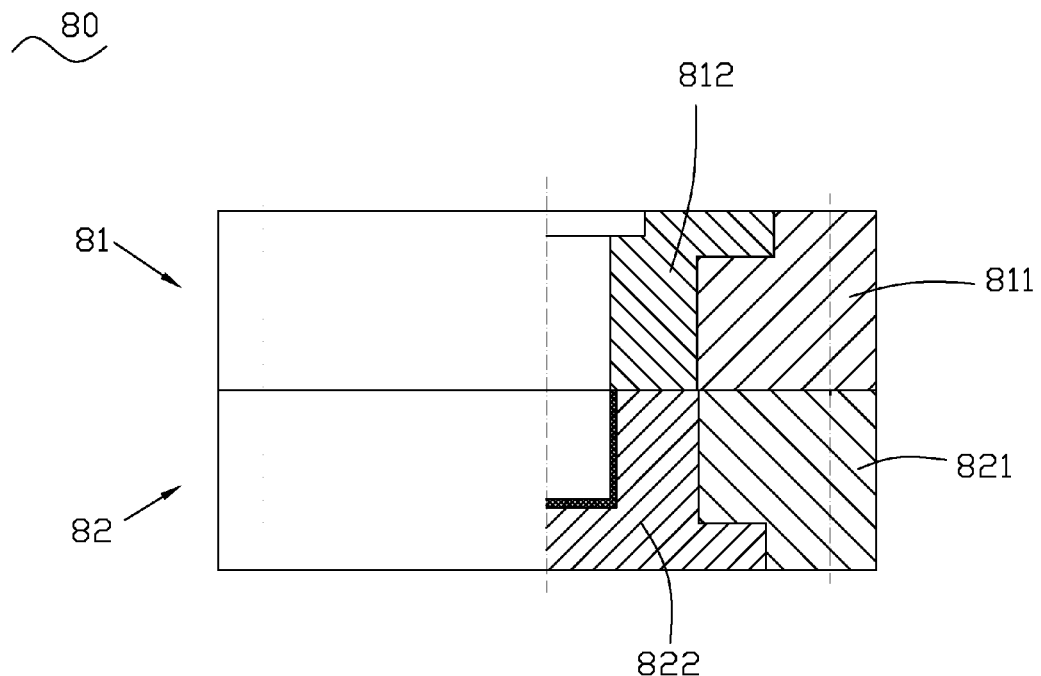
FIG. 6 shows a partial sectional view diagram of an injection mold in a closing mold status according to prior art.
Figure 7:
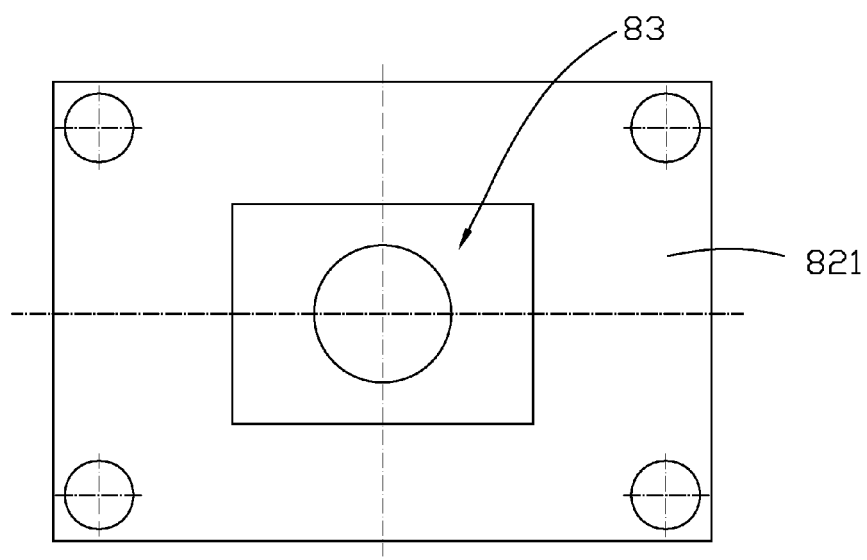
FIG. 7 shows a top view diagram of a fixed half of the injection mold shown in FIG. 6.

Please refer to FIG. 4 and FIG. 5. The fixed half 20 comprises a fixed half plate 21 and a fixed half cavity 22. The fixed half cavity 22 comprises a base 221. A sealing portion 222 protrudes at the upper end of the base 221. A cavity 223 is dented at the center of the upper end of the sealing portion 222. The cavity 223 assorts with the core 13 of the moving half 10. The fixed half cavity 22 is positioned on the fixed half plate 21. The fixed half cavity 22 can extend out of the fixed half plate 21 or can be positioned in the same horizontal plane as the fixed half plate 21. In this embodiment, the upper end surface of the base 221 of the fixed half cavity 22 and the upper end surface of the fixed half plate 21 are in the same horizontal plane. The upper end surface of the fixed half plate 21 is formed as being an arrangement surface 23 of the injection mold 1 for opening mold and closing mold. A plurality of bearing plates 24 are positioned on the fixed half plate 21 and a bearing surface 25 is formed thereon. In this embodiment, the bearing surface 25 and the arrangement surface 23 are in the same horizontal plane.

Please refer to FIG. 1. When the injection mold 1 is closed, the moving half core 12 and the fixed half cavity 22 are locked together. The sealing portion 222 of the fixed half 20 and the moving half core 12 of the moving half 10 are partially sealed. Because the bearing surface 25 is higher than the upper end surface of the base 221 of the fixed half cavity 22, a certain space exists between the moving half plate 11 and the fixed half plate 21. Therefore, the exhaust of the injection mold 1 during molding is well.

The injection mold 1 is installed on an injection molding machine. The injection mold 1 is required to have different bearing surface areas because the pressures of closing the mold for various injections are different. Please refer to FIG. 4. The bearing surface area S of the injection mold 1 satisfies the equation $S = E + N*S1$. E is the area of the arrangement surface 23; N represents the amount of the bearing plates 24; and S1 represents the area of the bearing plates 24. The injection mold 1 utilizes the bearing plates 24 to undertake the closing mold pressure with the arrangement surface 23 together. The closing mold pressure applied to the fixed half cavity 22 can be significantly reduced.

By increasing the bearing area of the bearing surface 25, the bearing surface area S can be ensured to be larger than S' (the necessary bearing area of the injection molding machine). Accordingly, the bearing surface area S of the injection mold 1 installed on the injection molding machine can be guaranteed and controlled to suffer the closing mold pressure in a reasonable range as repeating the closing mold operations. Therefore, in the injection mold 1 usage life time, the arrangement surface 23 will not be over pressed and generates the binder ringed, dished, press roasted or deformed phenomena.

During the manufactures of the injection mold 1 and the opening mold closing mold operations thereof, The demands for processing the moving half core 12 and the arrangement surface 23 of the fixed half cavity 22 are highly critical. Therefore, the manufacture time and the arrangement time can be shortened by decreasing the manufacture time of the moving half core 12 and the arrangement surface 23 of the fixed half cavity 22 and the arrangement time for molding thereof. The manufacture cost can be dropped and the productivity can be improved.

As aforementioned, the with the bearing plates 24 positioned between the moving half plate 11 and the fixed half plate 21, the bearing surface 25 and the arrangement surface 23 of the injection mold 1 can undertake the closing mold pressure generated by an injection molding machine for reducing the area of the arrangement surface 23. Accordingly, the molding can be easy and the molding cost drops so as to improve productivity. Furthermore, the closing mold balance of the entire injection mold 1 can be preferably ensured.

As is understood by a person skilled in the art, the foregoing preferred embodiments of the present invention are illustrative rather than limiting of the present invention. For example, the sealing portion 222 can be formed on the moving half core 12. The bearing plates 24 can be raised from the fixed half plate 21 by machine work. Alternatively, the bearing plates 24 also can be positioned on the moving half plate 11. It is intended that they cover various modifications and similar arrangements be included within the spirit and scope of the appended claims, the scope of which should be accorded the broadest interpretation so as to encompass all such modifications and similar structure.

What is claimed is:

1. An injection mold, comprising:
   a moving half, comprising a moving half plate and a moving half core, positioned on the moving half plate;
   a fixed half, comprising a fixed half plate and a fixed half cavity, positioned on the fixed half plate; and
   a plurality of bearing plates, positioned between the fixed half plate and the moving half plate and positioned on one of the fixed half plate and the moving half plate with a bearing surface on the bearing plates;
   wherein the moving half core and the fixed half cavity contact with each other partially to form an arrangement surface of the injection mold; and
   wherein the bearing surface and the arrangement surface are in a horizontal plane and the bearing plates are utilized to undertake a closing mold pressure.

2. The injection mold of claim 1, wherein the bearing plates are positioned on the fixed half plate.

3. The injection mold of claim 1, wherein the bearing plates are positioned on the moving half plate.

4. The injection mold of claim 1, wherein the fixed half cavity comprises a base with a sealing portion protruding at the upper end thereof, and an end surface of the sealing portion is formed as being the arrangement surface, and a cavity is dented at the center of the upper end of the sealing portion, wherein the moving half core comprises a core, and the moving half core and the moving half plate are in a horizontal plane, and the core extends out of the moving half core to assort with the cavity.

* * * * *